United States Patent
Smith et al.

(10) Patent No.: US 12,277,520 B2
(45) Date of Patent: Apr. 15, 2025

(54) METHOD AND AN APPARATUS FOR ROUTINE IMPROVEMENT FOR AN ENTITY

(71) Applicant: Strategic Coach, Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 24 days.

(21) Appl. No.: 18/141,320

(22) Filed: Apr. 28, 2023

(65) Prior Publication Data
US 2024/0362571 A1 Oct. 31, 2024

(51) Int. Cl.
*G06Q 10/0639* (2023.01)
*H04L 9/40* (2022.01)

(52) U.S. Cl.
CPC . *G06Q 10/06395* (2013.01); *G06Q 10/06398* (2013.01); *H04L 63/126* (2013.01)

(58) Field of Classification Search
None
See application file for complete search history.

(56) References Cited

U.S. PATENT DOCUMENTS

| | | | |
|---|---|---|---|
| 2006/0017978 A1* | 1/2006 | Minamino | H04N 1/4052 358/3.03 |
| 2011/0158524 A1* | 6/2011 | Ohba | H04N 19/85 382/167 |
| 2014/0114824 A1* | 4/2014 | Kong | G06Q 10/1091 705/32 |
| 2015/0100530 A1 | 4/2015 | Mnih et al. | |
| 2017/0256033 A1* | 9/2017 | Tuzel | G06T 3/4046 |
| 2017/0372225 A1* | 12/2017 | Foresti | G06Q 10/04 |
| 2019/0108275 A1* | 4/2019 | Gulli | G06N 3/045 |
| 2021/0086089 A1 | 3/2021 | Pardeshi et al. | |
| 2021/0308587 A1 | 10/2021 | Zhou et al. | |
| 2021/0383261 A1* | 12/2021 | Hanna | G06Q 10/105 |
| 2022/0004964 A1 | 1/2022 | Essafi | |
| 2022/0245557 A1* | 8/2022 | Minter | G06N 20/00 |

(Continued)

FOREIGN PATENT DOCUMENTS

| | | |
|---|---|---|
| CN | 113570481 A | 10/2021 |
| KR | 10-2015-0053317 A | 5/2015 |

OTHER PUBLICATIONS

Khanbabaei, "Applying clustering and classification data mining techniques for competitive and knowledge-intensive processes improvement," 2019, Knowledge and Process Management, vol. 26, pp. 123-129 (Year: 2019).*

(Continued)

*Primary Examiner* — Ivan R Goldberg
(74) *Attorney, Agent, or Firm* — Caldwell Intellectual Property Law

(57) ABSTRACT

A method for routine improvement for an entity may include receiving an entity profile, generating, by a first datum, and receiving a second datum. The method may include generating at least an entity-specific improvement recommendation as a function of the second datum. Further, the method may include determining at least a user interface element as a function of the at least an entity-specific improvement recommendation. Moreover, the method may include transmitting the at least a user interface element to a display.

20 Claims, 8 Drawing Sheets

(56) References Cited

U.S. PATENT DOCUMENTS

2022/0374812 A1* 11/2022 Riedl ................ G06F 16/9024
2023/0036730 A1    2/2023 Casa

OTHER PUBLICATIONS

Malik, "Elevating talents' experience through innovative artificial intelligence-mediated knowledge sharing: Evidence from an IT-multinational enterprise," 2021, Journal of International Management, vol. 27, 100871, 18 pages (Year: 2021).*

* cited by examiner

METHOD AND AN APPARATUS FOR ROUTINE IMPROVEMENT FOR AN ENTITY

FIELD OF THE INVENTION

The present invention generally relates to the field of artificial intelligence. In particular, the present invention is directed to a method and an apparatus for routine improvement for an entity.

BACKGROUND

In general, Processes for performance of tasks represent a challenge for automated optimization algorithms. In particular, the multiplicity of variables to account for lead to inadequate constraints.

SUMMARY OF THE DISCLOSURE

In an aspect a method for routine improvement for an entity is provided. The method may include receiving, by at least a processor, an entity profile, generating, by the at least a processor, a first datum, and receiving, by the at least a processor, a second datum. Further, the method may include generating, by the at least a processor, at least an entity-specific recommendation as a function of the second datum, determining, by the at least a processor, at least a user interface element as a function of the at least an entity-specific recommendation, and transmitting, by the at least a processor, the at least an interface element to a display.

In another aspect, an apparatus for routine improvement for an entity is provided. The apparatus may include at least a processor; and a memory communicatively connected to the processor. The memory may contain instructions configuring the at least a processor to receive an entity profile, generate a first datum, and receive a second datum. Further, the processor may be configured to generate at least an entity-specific recommendation as a function of the second datum, determine at least a user interface element as a function of the at least an entity-specific recommendation, and transmit the at least an interface element to a display.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for routine improvements for an entity. In an embodiment, methods may include utilizing machine-learning to generate at least a recommendation for the routine improvements for an entity.

Aspects of the present disclosure can be used to process images using interpolation methods. Exemplary embodiments illustrating aspects of the present disclosure are described below in the context of several specific examples.

Figure 1:
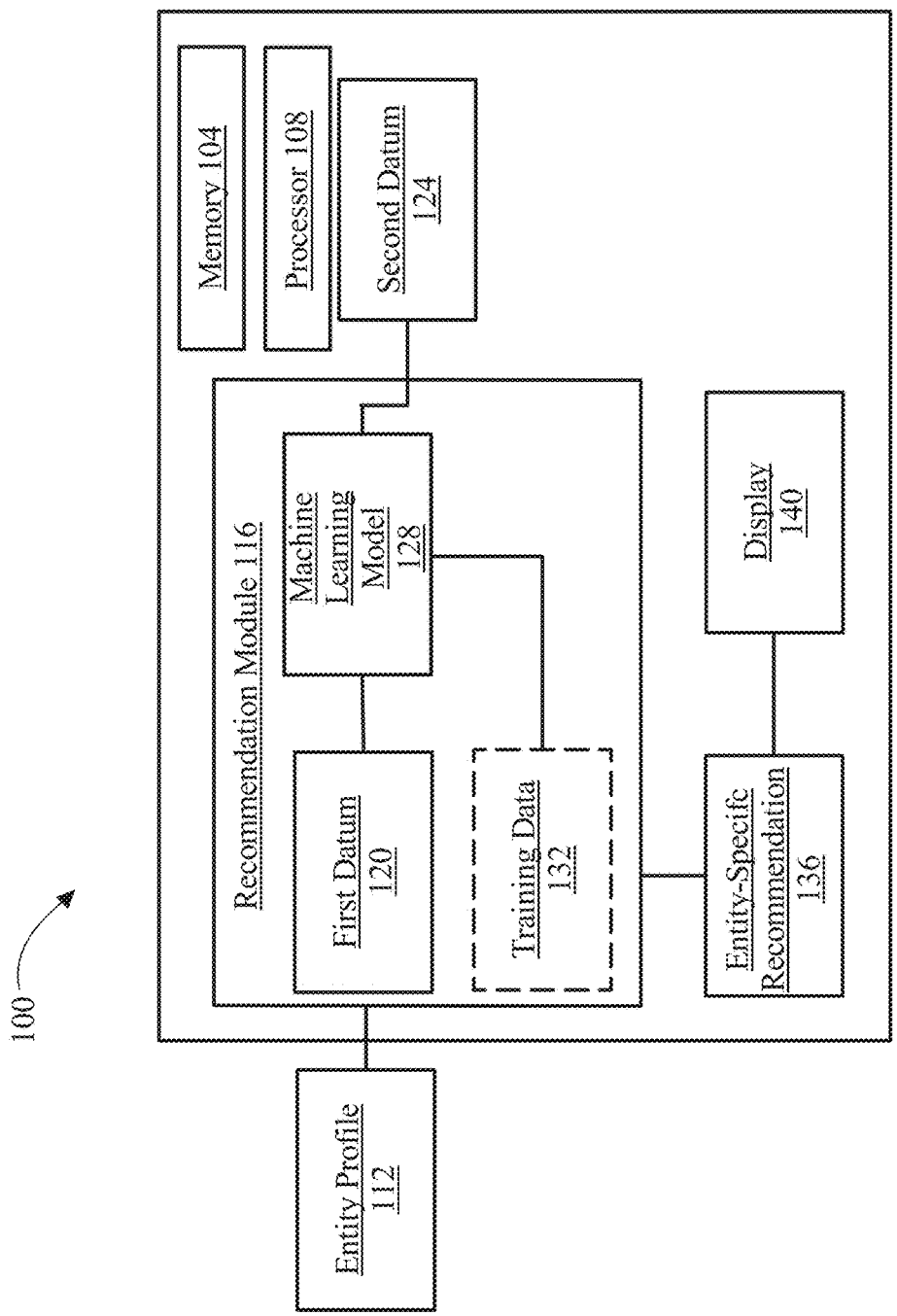
FIG. 1 is a block diagram of an exemplary embodiment of an apparatus for routine improvement for an entity.

Referring now to FIG. 1, an exemplary embodiment of an apparatus 100 for routine improvement for an entity is illustrated. Apparatus may include a memory. Apparatus may include a processor. Processor may include, without limitation, any processor described in this disclosure. Apparatus may include any apparatus as described in this disclosure, including without limitation a microcontroller, microprocessor, digital signal processor (DSP) and/or system on a chip (SoC) as described in this disclosure. Apparatus may include, be included in, and/or communicate with a mobile device such as a mobile telephone or smartphone. Apparatus may include a single apparatus operating independently, or may include two or more apparatus operating in concert, in parallel, sequentially or the like; two or more apparatus s may be included together in a single apparatus or in two or more apparatus s. Apparatus may interface or communicate with one or more additional devices as described below in further detail via a network interface device. Network interface device may be utilized for connecting apparatus to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two apparatus s, and any combinations thereof. A network may employ a wired and/or a wireless mode of communication. In general, any network topology may be used. Information (e.g., data, software etc.) may be communicated to and/or from a computer and/or an apparatus. Apparatus may include but is not limited to, for example, an apparatus or cluster of apparatus s in a first location and a second apparatus or cluster of apparatus s in a second location. Apparatus may include one or more apparatus s dedicated to data storage, security, distribution of traffic for load balancing, and the like. Apparatus may distribute one or more computing tasks as described below across a plurality of apparatus s of apparatus, which may operate in parallel, in series, redundantly, or in any other manner used for distribution of tasks or memory between apparatus. Apparatus may be implemented, as a non-limiting example, using a "shared nothing" architecture.

With continued reference to FIG. 1, apparatus 100 may be designed and/or configured to perform any method, method step, or sequence of method steps in any embodiment described in this disclosure, in any order and with any degree of repetition. For instance, apparatus 100 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Apparatus 100 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 may receive an entity profile 112. As used in this disclosure, "entity profile" is a grouping of data relating to an entity's abilities which contains basic entity information as well as data relating to an entity's talents and abilities. As a non-limiting embodiment, entity profile may include unique ability data such as, and without limitation, entity's unique talents (e.g. can memorize large amounts of information, is a sociable person, great a problem solving, can resolve disputes quickly, excellent customer service). Entity profile 112 may include an entity's passions (e.g. film, exercise, family, charitable donations, nonprofit work), goals (e.g., career goals, personal lifestyle goals, and the like), hobbies, strengths, weaknesses, previous education, likes (e.g. foods, various tasks, music genres, etc.), dislikes, athletic ability (e.g., capable of running at high speeds, or lifting heavy weights), professional ability (can work long hours, can draft legal motions, can file taxes, event planning etc.) preferences (morning vs night owl, active or sedentary work life, 6-day work week vs 5 day with extended hours), habits and the like. Entity profile 112 may further include an entity's competent activities and incompetent activities.

With continued reference to FIG. 1, entity profile 112 may include basic information, such as and without limitations, age, gender, marital and/or family status, previous work history, previous education history and the like. In some embodiments, entity profile 112 may be received through an input device. In some instances, input device may be apparatus 100. In some instances, input device may include a remote device. In instances where entity profile 112 is input into a remote input device, remote device may transmit entity profile 112 across a wireless connection. In some embodiments, wireless connection may be any suitable connection (e. g., radio, cellular). In some instances, input device may include a computer, laptop, smart phone, tablet, or things of the like. In some instances, entity profile 112 may be stored in a data store and associated with an entity account. It should be noted that data store may be accessed by any input device, using authorization credentials associated with entity profile 112. In some instances, entity profile 112 may be created and stored via a laptop and accessed from tablet, using authorization credentials.

With continued reference to FIG. 1, apparatus 100 may receive entity profile 112 at recommendation module 116. In some embodiments, recommendation module 116 may have formatting requirements to ensure efficient processing and output of data from recommendation module 116. Keeping that in mind, apparatus 100 may utilize processor 108 to perform pre-processing on entity profile 112. It should be noted that processor 108 may perform pre-processing for any data input to apparatus 100. Methods of pre-processing may include interpolation processes as discussed in more detail below.

Still referring to FIG. 1, processor 108 may use interpolation and/or upsampling methods to process entity profile 112. For instance, where authentication credentials include image data, processor 108 may convert a low pixel count image into a desired number of pixels need to for input into an image classifier; as a non-limiting example, an image classifier may have a number of inputs into which pixels are input, and thus may require either increasing or decreasing the number of pixels in an image to be input and/or used for training image classifier, where interpolation may be used to increase to a required number of pixels. As a non-limiting example, a low pixel count image may have 100 pixels, however a number of pixels needed for an image classifier may be 128. Processor 108 may interpolate the low pixel count image to convert the 100 pixels into 128 pixels so that a resultant image may be input into an image classifier. It should be noted that image classifier may be any classifier as described in this disclosure. It should also be noted that one of ordinary skill in the art, upon reading this disclosure, would know the various methods to interpolate a low pixel count image to a desired number of pixels required by an image classifier. In some instances, a set of interpolation rules may be trained by sets of highly detailed images and images that may have been downsampled to smaller numbers of pixels, for instance and without limitation as described below, and a neural network or other machine learning model that is trained using the training sets of highly detailed images to predict interpolated pixel values in a facial picture context. As a non-limiting example, a sample picture with sample-expanded pixels (e.g., pixels added between the original pixels) may be input to a neural network or machine-learning model and output a pseudo replica sample-picture with dummy values assigned to pixels between the original pixels based on a set of interpolation rules. In some instances, image classifier and/or another machine-learning model may have a set of interpolation rules trained by sets of highly detailed images and images that have been downsampled to smaller numbers of pixels, and a neural network or other machine learning model that is trained using those examples to predict interpolated pixel values in a facial picture context. I.e., you run the picture with sample-expanded pixels (the ones added between the original pixels, with dummy values) through this neural network or model and it fills in values to replace the dummy values based on the rules.

Still referring to FIG. 1, processor 108 may utilize sample expander methods, a low-pass filter, or both. As used in this disclosure, a "low-pass filter" is a low-pass filter is a filter that passes signals with a frequency lower than a selected cutoff frequency and attenuates signals with frequencies higher than the cutoff frequency. The exact frequency response of the filter depends on the filter design. In some embodiments, processor 108 may use luma or chroma averaging to fill in pixels in between original image pixels. Processor 108 may down-sample image data to a lower number of pixels to input into an image classifier. As a non-limiting example, a high pixel count image may have 356 pixels, however a number of pixels need for an image classifier may be 128. Processor 108 may down-sample the high pixel count image to convert the 356 pixels into 128 pixels so that a resultant image may be input into an image classifier.

In some embodiments, and with further reference to FIG. 1, processor may be configured to perform downsampling on data such as without limitation image data. For instance, and without limitation, where an image to be input to image classifier, and/or to be used in training examples, has more pixel than a number of inputs to such classifier. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Continuing to refer to FIG. 1, any training data described in this disclosure may include two or more sets of image quality-linked training data. "Image quality-linked" training data, as described in this disclosure, is training data in which each training data element has a degree of image quality, according to any measure of image quality, matching a degree of image quality of each other training data element, where matching may include exact matching, falling within a given range of an element which may be predefined, or the like. For example, a first set of image quality-linked training data may include images having no or extremely low blurriness, while a second set of image quality-linked training data. In an embodiment, sets of image quality-linked training data may be used to train image quality-linked machine-learning processes, models, and/or classifiers as described in further detail below.

Referring still to FIG. 1, training data, images, and/or other elements of data suitable for inclusion in training data may be stored, without limitation, in an image database. Image database may include any data structure for ordered storage and retrieval of data, which may be implemented as a hardware or software module. Image database may be implemented, without limitation, as a relational database, a key-value retrieval datastore such as a NOSQL database, or any other format or structure for use as a datastore that a person skilled in the art would recognize as suitable upon review of the entirety of this disclosure. An image database may include a plurality of data entries and/or records corresponding to user tests as described above. Data entries in an image database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in an image database may reflect categories, cohorts, and/or populations of data consistently with this disclosure. Image database may be located in memory 104 of apparatus 100 and/or on another device in and/or in communication apparatus 100.

Still referring to FIG. 1, an exemplary embodiment of an image database is illustrated. One or more tables in image database may include, without limitation, an image table, which may be used to store images, with links to origin points and/or other data stored in image database and/or used in training data as described in this disclosure. Image database may include an image quality table, where categorization of images according to image quality levels, for instance for purposes of use in image quality-linked training data, may be stored. Image database may include a demographic table; demographic table may include any demographic information concerning users from which images were captured, including without limitation age, sex, national origin, ethnicity, language, religious affiliation, and/or any other demographic categories suitable for use in demographically linked training data as described in this disclosure. Image database may include an anatomical feature table, which may store types of anatomical features, including links to diseases and/or conditions that such features represent, images in image table that depict such features, severity levels, mortality and/or morbidity rates, and/or degrees of acuteness of associated diseases, or the like. Persons skilled in the art, upon reviewing the entirety of this disclosure, will be aware of various alternative or additional data which may be stored in image database.

Still referring to FIG. 1, processor 108 may receive entity profile 112 that may include authorization image data. Image data may include pixel data of varying range. In instances where authorization image data does not match stored pixel data, processor 108 may transform authorization image data to stored pixel data. In some embodiments, pre-processing entity profile 112 may include processor 108 may compare entity profile image data to stored pixel data. In some instances, entity profile image data may be transformed from its original state. Processor 108 may compare original entity profile image data to stored pixel data. Entity profile image data may differ in pixel count, thus, only a percentage of pixel data may match up. As a non-limiting example, at least 90 percent of pixel data may match. It should be noted that a percent match may be at least 95 percent, at least 90 percent, at least 80 percent, or the like. Processor may flag any entity that sends entity profile 112 that have less than the specified amount of pixel data matchup.

Still referring to FIG. 1, entity profile 112 may be digital signatures. As a non-limiting example, entity may use a device capable of fingerprinting. In some instances, entity profile 112 may be a digital fingerprint. In some embodiments, digital fingerprint may be a digital scan of entity finger, face, or any identifying feature. Digital fingerprint may be stored in a database and retrieved upon processor 108 receiving entity profile 112 from entity. Digital fingerprint received from entity may be compared to a stored fingerprint associated with entity using methods described above. In some instances, digital fingerprint may be an image of an identifying feature. A certainty percentage threshold may be lower for an image of identifying feature in comparison to a digital fingerprint to account for confounding variables including but not limited to camera quality, formatting, transmission packet loss, or the like.

With continued reference to FIG. 1, processor 108 may receive an IP address associated with a known location of entity. Entity profile 112 may include IP address. In some embodiments, IP address may be appended to any data packet containing entity profile 112 data. In some instances, time elapsed during data transmission may be used to authenticate entity. As a non-limiting example, time elapsed may be the time it takes for a data packet to be transmitted between a computing device associated with entity and processor 108. In some embodiments, time elapsed may be the time it takes for a first data packet to be transmitted from a computing device associated with entity to processor 108 and a second data packet transmitted from processor 108 to entity. Processor 108 may authenticate entity as a function of time elapsed by comparing actual time elapsed to an expected time elapsed. Expected time elapsed may be calculated as function of network latency, expected data packet size, and the like. In instances of fraud attempts, processor 108 may determine that time elapsed is below a certainty percentage threshold as described above. As a non-limiting example, a spoof account may be located in different location than entity. Therefore, data packet transmission may take more or less time than expected. Accordingly, processor 108 may flag spoof account as fraudulent. In some instances, a fraudulent verifier may use a proxy server to attempt to authenticate themselves. Data packet transmission may take more or less time than expected. Accordingly, processor 108 may flag fraudulent verifier as fraudulent. It should be noted that IP addresses associated with flagged accounts may be stored in a database to preserve computational resources if multiple fraudulent attempts come from the same account. As a non-limiting example, processor 108 may receive fraudulent entity profile 112 data packet with a flagged IP address appended to the data packet. Processor 108 may compare the data packet to stored flagged IP addresses. If the IP address appended to the data packet matches a stored flagged IP address, processor 108 may not authenticate verifier. It should be noted that flagged IP addresses may be added manually by first entity 124, second entity 128, or both.

Still referring to FIG. 1, recommendation module 116 may instantiated by processor 108. In some embodiments, processor 108 may generate first datum 120. As used in this disclosure, "first datum" is an entity capability metric that measures an entity's ability to complete tasks. As a non-limiting example, first datum 120 may indicate that an entity may complete tasks near the task's due date. In some embodiments, first datum 120 may indicate that entity may complete tasks during a certain time period within a day, week, month, or the like. In some embodiments, first datum 120 may include data may include a plurality of skills associated with entity profile 112. For example, skills data may include "anxiety management skill" if an entity indicates they work in a high stress environment. Skill data may include data relating to skills such as communication, problem solving, writing, leadership, creativity, management, negotiations, critical thinking, negotiation, data analysis, public speaking, patience, sales, research, analytics, customer service, coding, computer literacy, legal skills, multitasking, analytic reasoning and the like.

Still referring to FIG. 1, first datum 120 may include score data wherein score data is a score associated with each score in user skill. Score data may include a numeral value wherein a skill within skill data contains a numerical value based on an entity's capabilities of the skill. Score data may include a tiered value system wherein a 1 may indicate that their particular level for a specific skill is low, whereas a 6 may indicate that the entity's particular skill level is high. Similarly score data may further include a score rated on 1-100, or any other score that may resemble a user's skill level.

Still referring to FIG. 1, first datum 120 may include passion score data. Passion score data is a score related to a person's passion related to a particular skill. For example, a user may not have a high skill level in mathematics, however the user may not be passionate about math. Passion score level may contain similar score levels as mentioned in score data. Still referring to FIG. 1, first datum 120 may be generated using any computer process, including without limitation a machine learning model. Machine learning model may generate a list of skills, score data, and passion score data by comparing a plurality of entity profiles to first datum. First datum 120 may further be generated using any computing algorithm.

Still referring to FIG. 1, first datum 120 may be generated by utilizing a first datum machine learning model. First datum machine learning model may be trained with a first training data. First training data may include entity profiles correlated to first data. In some embodiments, first training data may include historical entity profiles correlated to historical first data. In some instances, first training data may be generated from previous iterations of first datum machine learning inputs and respective outputs. In some embodiments, first training data may include a combination of historical inputs correlated to historical outputs that fall within a threshold value of an output associated therewith. As a non-limiting example, a first iteration of first datum machine learning model may have a historical input that may have a particular output, but the second iteration may have a different, distinct, input/output combination. For a third iteration, first datum machine learning model may be trained with training data that correlates inputs from the first iteration and outputs of the second iteration, as long as outputs of the second iteration fall within a threshold value of the outputs of the first iteration. Combining historical inputs and outputs may add variance to first datum machine learning model to create a more robust machine learning model. processor 108memory 104processor 108Attribute cluster Attribute cluster attribute cluster attribute cluster attribute cluster Still referring to FIG. 1, recommendation module 116 may receive a second datum 124. As used in this disclosure, "second datum" is a list of at least a predetermined recommendation. Second datum 124 may include personal improvements, professional improvements, or things of the like. In some embodiments, second datum 124 may include data relating to a plurality of lifestyle improvements. This may include switching careers, taking on specific hobbies, changing eating habits, stopping specific hobbies, changing routines, changing schedules, prioritizing various tasks and the like.

Still referring to FIG. 1, second datum 124 may be received from a data store. In some instances, second datum 124 may be stored in a same data store as entity profile 112. Second datum 124 may be created by a third-party entity such as a life coach or another professional in a similar field. Second datum 124 may further include at least a previously generated improvement recommendation for other entities that fall within a degree of similarity of the entity. As a non-limiting example, entity may be within a certain socio-economic class, race, and gender. Second datum 124 may include previously generated improvement recommendations from any demographic associated with the entity.

Still referring to FIG. 1, any data as described in this disclosure (e.g., first datum, second datum) may be represented as a vector. As used in this disclosure, "vector" is a data structure that represents one or more quantitative values. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 3, 4]. Vectors may be more similar where their directions are more similar, and more different where their directions are more divergent, for instance as measured using cosine similarity as computed using a dot product of two vectors; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes.

Still referring to FIG. 1, a database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, first datum 120 and second datum 124 may be input into a recommendation machine learning model 128. Recommendation machine learning model 128 may be any suitable machine learning model as described in this disclosure. Recommendation machine learning model 128 may be utilized to output at least an entity-specific recommendation 136. In some embodiments, machine learning model 128 may utilize first datum 120 and entity profile 112 as inputs. As a non-limiting example, first datum 120 may include entity capability metric and entity profile 112 may include geolocation-based activities that an entity has completed in the past. Recommendation machine learning model 128 may then output an entity-specific recommendation 136 as a function of first datum 120 and entity profile 112. In some instances, recommendation machine learning model 128 may be trained with training data 132. Training data 132 may be any suitable training data as used in this disclosure. In some embodiments, training data 132 may include historical entity profiles 112 and historical first datum 120 correlated to historical entity-specific recommendations. In some embodiments, training data 132 may include previous iterations of recommendation machine learning model 128 that receives inputs of first datum 120 and entity profile 112 to output at least an entity-specific recommendation 136. In some instances, training data 132 may include historical entity profiles 112 correlated to historical entity-specific recommendations 136. Recommendation machine-learning model may, alternatively or additionally, generate one or more scores indicating a degree of desirability, profitability or the like of a given candidate second datum.

Still referring to FIG. 1, processor 108 may identify a plurality of attribute clusters 116. In some embodiments, apparatus 100 may include at least a processor 108 and a memory 104 communicatively connected to processor 108, the memory 104 containing instructions configuring the at least processor 108 to identify a plurality of attribute clusters.

Still referring to FIG. 1, as used herein, an "attribute cluster" is a collection of at least one attribute of an entity. In non-limiting examples, an entity may include a person or a company. An attribute may include any or all of a feature, section, knowledge, asset, or skill of an entity. In non-limiting examples, if an entity is a company, attribute may include a branch of the company or a particular area of expertise of employees of the company. Attribute cluster may include a single attribute of the entity, or it may include more than one attribute. Attribute cluster may include multiple related attributes. In a non-limiting example, attribute cluster may include knowledge of how to paint and an inventory of paintbrushes. In another non-limiting example, attribute cluster may include knowledge of how to use several computer programs, each useful for an aspect of creating virtual artwork. In another non-limiting example, attribute cluster may include knowledge of how to use a single computer program.

Still referring to FIG. 1, in some embodiments, apparatus 100 may identify a plurality of attributes by using attribute classifier. Attribute classifier may receive as inputs entity data and predetermined attribute list and may output attribute. Attribute classifier may be trained on a dataset including historical entity data associated with historical attributes. As a non-limiting example, attribute classifier may be trained on a dataset including, for each historical entity in the dataset, historical entity data associated with which computer programs employees of that entity had expertise in; attribute classifier trained on such data may be capable of associating entity data with attributes, where the attributes include which computer programs employees of the entity have expertise in. As another non-limiting example, attribute classifier may be trained on a dataset including, for each historical entity in the dataset, historical entity data associated with which physical assets such as machines and land that entity possessed; attribute classifier trained on such data may be capable of associating entity data with attributes, where the attributes include which physical assets an entity possesses. As another non-limiting example, attribute classifier may be trained on a dataset including, for each historical entity in the dataset, historical entity data associated with which languages employees of that entity spoke; attribute classifier trained on such data may be capable of associating entity data with attributes, where the attributes include which languages employees of an entity speak. Entity data may be processed before it is input into attribute classifier, such as using optical character recognition, a language model, and/or data type conversions as described below. Attribute classifier may also accept as an input predetermined attribute list and may associate entity data with attributes on the predetermined attribute list.

Still referring to FIG. 1, in some embodiments, apparatus 100 may locate in the plurality of attribute clusters an outlier cluster. processor 108memory 104processor 108memory 104processor 108 In some embodiments, apparatus 100 may determine outlier cluster as a function of impact metric. As used herein, an "impact metric" is a measure of the degree to which an attribute cluster supports a target process. In some embodiments, processor 108 may determine impact metric using an impact metric machine learning model. In some embodiments, impact metric machine learning model may be trained on data sets including historical attribute clusters, and historical target processes, associated with ratings of the degree to which historical attribute clusters support the historical target processes. Such ratings may be obtained, in a non-limiting example, from average ratings of experts as to the degree to which these historical attribute clusters supported these historical target processes. Impact metric machine learning model may accept as inputs attribute cluster and target process and may output impact metric.

Still referring to FIG. 1, in some embodiments, processor 108 may determine outlier cluster as a function of impact metric 144. In some embodiments, processor 108 may use impact metric machine learning model to determine an impact metric associated with a set of attribute clusters. In some embodiments, processor 1088 may determine outlier cluster to include attribute cluster associated with impact metric that indicates that the attribute cluster provides substantial support to target process. In some embodiments, processor 108 may determine outlier cluster to include attribute cluster associated with impact metric that indicates that the attribute cluster supports target process more than other attribute clusters. In some embodiments, processor 108 may determine outlier cluster to include attribute cluster associated with impact metric that indicates that the attribute cluster supports target process more than an attribute cluster representing the population average would. In a non-limiting example, attribute cluster may represent a number of attributes associated with skill with certain computer programs, and processor 108 may determine attribute cluster to be an outlier cluster 140 where impact metric 144 associated with attribute cluster indicates that attribute cluster supports target process more than an attribute cluster indicating average skill with those computer programs would. In non-limiting examples, population averages may include population averages among all entities, or a subset of entities, such as all entities in a particular industry. In some embodiments, processor 108 may determine outlier cluster to include attribute cluster associated with impact metric 144 that indicates that the attribute cluster supports target process more than an attribute cluster associated with a different entity. In a non-limiting example, processor 108 may use processes described herein, with external entity data, such as entity data associated with a third party, in order to determine attribute clusters associated with a different entity, and processor may compare attribute clusters or impact metrics with those of different entities to determine which attribute clusters are outlier clusters.

Still referring to FIG. 1, in some embodiments, apparatus 100 may receive target process from a target process source. In some embodiments, a target process data source may include a computing device such as a smartphone, tablet, or computer, that accepts human data input.

Still referring to FIG. 1, in some embodiments, locating in plurality of attribute clusters outlier cluster includes identifying target process, inputting target process into impact metric machine learning model, inputting attribute cluster into impact metric machine learning model, receiving impact metric from impact metric machine learning model, and determining outlier cluster as a function of impact metric. In some embodiments, locating in plurality of attribute clusters outlier cluster includes identifying external attribute clusters, inputting the external attribute clusters into impact metric machine learning model, inputting target process into impact metric machine learning model, receiving an external impact metric from the impact metric machine learning model, and determining outlier cluster as a function of impact metric and the external impact metric. In some embodiments, impact metric indicates higher aptitude in the attribute cluster than the external impact metric.

Still referring to FIG. 1, in some embodiments, locating in plurality of attribute clusters outlier cluster includes identifying two or more partial outlier clusters, and determining outlier cluster as a function of the two or more partial outlier clusters. In a non-limiting example, neither of a first attribute cluster and a second attribute cluster may be outlier clusters individually, but the combination of those attributes together may be sufficiently rare that processor 108 may determine a combination of the two attribute clusters to be an outlier cluster. In some embodiments, locating in the plurality of attribute clusters an outlier cluster includes identifying target process, inputting target process into impact metric machine learning model, inputting a first attribute cluster into impact metric machine learning model, inputting a second attribute cluster into impact metric machine learning model, receiving a first impact metric from impact metric machine learning model, receiving a second impact metric from impact metric machine learning model, and determining outlier cluster as a function of first impact metric and second impact metric, wherein first impact metric is associated with first attribute cluster and second impact metric is associated with second attribute cluster.

Still referring to FIG. 1, in some embodiments, processor 108 may determine outlier cluster without the use of impact metric machine learning model. In some embodiments, processor may determine outlier cluster as a function of the rarity of attribute clusters among a plurality of entities. As described above, processor 108 may determine attributes and attribute clusters applicable to third party entities based on external entity data. Processor 108 may determine attributes and attribute clusters applicable to a set of entities, such as the set of companies in an industry. Processor 108 may then determine outlier cluster for an entity based on which attribute clusters are least prevalent in the set of entities. In a non-limiting example, processor 108 may determine attributes and attribute clusters for entities in the cell phone manufacturing industry with revenue above a predetermined amount. In this example, processor 108 may determine an outlier cluster for one of those entities by examining which of that entity's attribute clusters is least prevalent among the set of entities.

Still referring to FIG. 1, in some embodiments, processor 108 may determine outlier cluster 140 as a function of a value associated with attribute cluster. In some embodiments, processor 108 may determine outlier cluster 140 as a function of the degree to which attribute cluster is being utilized. In a non-limiting example, the degree to which an attribute cluster is being utilized may be estimated as a function of which elements of entity data discuss the attribute cluster. In a non-limiting example, an entity may have a first attribute cluster associated with employees of that entity being fluent in English, and an entity may have a second attribute cluster associated with employees of that entity being fluent in French. In this example, if internal entity documents discuss fluent in English, but employee social media accounts include posts indicating fluency in French, then this may be an indication that their fluency in French is being utilized less, and processor 108 may determine the attribute cluster associated with fluency in French to be outlier cluster as a result. In another non-limiting example, the degree to which attribute cluster is being utilized may be estimated as a function of which internal communications discuss attribute cluster. In a non-limiting example, if internal communications involving manager-level employees rarely discuss attribute cluster, then manager-level employees may not be considering attribute cluster when making decisions, meaning attribute cluster may be utilized less than other attribute clusters that are being discussed by manager-level employees more frequently. In this example, processor 108 may determine attribute cluster to be outlier cluster as a result of a low estimate of attribute cluster's utilization. In some embodiments, which documents and/or communications discuss attribute and/or attribute cluster may be determined, for example, using a language model as described above.

Still referring to FIG. 1, in some embodiments, processor 108 may determine outlier cluster as a function of a comparison values associated with third parties having similar attribute clusters to attribute cluster. In a non-limiting example, processor 108 may determine attribute clusters for a set of entities, such as entities in an industry. In this example, processor 108 may determine an estimate of the size of each entity in the set, such as using the revenue of an entity to estimate its size. In this example, processor 108 may determine the attribute cluster that is shared between entities with the lowest total revenue to be outlier cluster.

Still referring to FIG. 1, in some embodiments, processor 108 may communicate attributes and/or attribute clusters to a user device, and may receive a selection of one or more attributes and/or attribute clusters, and processor 108 may determine this selection to be outlier cluster. Systems and methods for communicating information are described further below.

Still referring to FIG. 1, in some embodiments, apparatus 100 may determine an outlier process as a function of an outlier cluster. In some embodiments, apparatus 100 may include at least a processor 108 and a memory 104 communicatively connected to the at least processor 108, the memory 104 containing instructions configuring the at least processor 108 to determine an outlier process as a function of an outlier cluster.

Still referring to FIG. 1, in some embodiments, apparatus 100 may determine outlier process using outlier process machine learning model. In some embodiments, outlier process machine learning model may be trained using historical attribute clusters associated with historical processes which the entities associated with the historical attribute clusters were proficient in. In some embodiments, historical attribute clusters may be determined using processes for determining attribute clusters described herein, applied to historical entity data such as public statements by an entity, financial reports by an entity, and social media posts by an entity or its employees. In some embodiments, historical processes entities were proficient in may be determined by taking an average of ratings by experts in that industry or by taking an average of ratings by former employees of an entity. In some embodiments, outlier process machine learning model may accept as an input outlier cluster and may output outlier process.

Still referring to FIG. 1, in some embodiments, outlier process machine learning model may include a k-means clustering model and/or algorithm. A "k-means clustering algorithm" as used in this disclosure, includes cluster analysis that partitions n observations or unclassified cluster data entries into k clusters in which each observation or unclassified cluster data entry belongs to the cluster with the nearest mean, using, for instance behavioral training set as described above. "Cluster analysis" as used in this disclosure, includes grouping a set of observations or data entries in way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as biclustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster; for instance, and without limitation, a fuzzy clustering algorithm may be used to identify clustering of gene combinations with multiple disease states, and vice versa. Cluster analysis may include strict partitioning clustering whereby each observation or unclassified cluster data entry belongs to exactly one cluster. Cluster analysis may include strict partitioning clustering with outliers whereby observations or unclassified cluster data entries may belong to no cluster and may be considered outliers. Cluster analysis may include overlapping clustering whereby observations or unclassified cluster data entries may belong to more than one cluster. Cluster analysis may include hierarchical clustering whereby observations or unclassified cluster data entries that belong to a child cluster also belong to a parent cluster.

With continued reference to FIG. 1, computing device may generate a k-means clustering algorithm receiving unclassified physiological state data and outputs a definite number of classified data entry clusters wherein the data entry clusters each contain cluster data entries. K-means algorithm may select a specific number of groups or clusters to output, identified by a variable "k." Generating a k-means clustering algorithm includes assigning inputs containing unclassified data to a "k-group" or "k-cluster" based on feature similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of feature values which are utilized to classify data entry clusters containing cluster data entries. K-means clustering algorithm may act to identify clusters of closely related physiological data, which may be provided with user cohort labels; this may, for instance, generate an initial set of user cohort labels from an initial set of user physiological data of a large number of users, and may also, upon subsequent iterations, identify new clusters to be provided new user cohort labels, to which additional user physiological data may be classified, or to which previously used user physiological data may be reclassified.

With continued reference to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids $c_i$ of centroids in set C. Unclassified data may be assigned to a cluster based on $\text{argmin}_{c_i \notin C} \text{ dist } (c_i, x)^2$, where argmin includes argument of the minimum, ci includes a collection of centroids in a set C, and dist includes standard Euclidean distance. K-means clustering module may then recompute centroids by taking mean of all cluster data entries assigned to a centroid's cluster. This may be calculated based on $c_i = 1/|S_i| \Sigma x_i \notin S_i^{x_i}$. K-means clustering algorithm may continue to repeat these calculations until a stopping criterion has been satisfied such as when cluster data entries do not change clusters, the sum of the distances have been minimized, and/or some maximum number of iterations has been reached.

Still referring to FIG. 1, k-means clustering algorithm may be configured to calculate a degree of similarity index value. A "degree of similarity index value" as used in this disclosure, includes a distance measurement indicating a measurement between each data entry cluster generated by k-means clustering algorithm and a selected physiological data set. Degree of similarity index value may indicate how close a particular combination of genes, negative behaviors and/or negative behavioral propensities is to being classified by k-means algorithm to a particular cluster. K-means clustering algorithm may evaluate the distances of the combination of genes, negative behaviors and/or negative behavioral propensities to the k-number of clusters output by k-means clustering algorithm. Short distances between a set of physiological data and a cluster may indicate a higher degree of similarity between the set of physiological data and a particular cluster. Longer distances between a set of physiological behavior and a cluster may indicate a lower degree of similarity between a physiological data set and a particular cluster.

With continued reference to FIG. 1, k-means clustering algorithm selects a classified data entry cluster as a function of the degree of similarity index value. In an embodiment, k-means clustering algorithm may select a classified data entry cluster with the smallest degree of similarity index value indicating a high degree of similarity between a physiological data set and the data entry cluster. Alternatively or additionally k-means clustering algorithm may select a plurality of clusters having low degree of similarity index values to physiological data sets, indicative of greater degrees of similarity. Degree of similarity index values may be compared to a threshold number indicating a minimal degree of relatedness suitable for inclusion of a set of physiological data in a cluster, where degree of similarity indices a-n falling under the threshold number may be included as indicative of high degrees of relatedness. The above-described illustration of feature learning using k-means clustering is included for illustrative purposes only, and should not be construed as limiting potential implementation of feature learning algorithms; persons skilled in the art, upon reviewing the entirety of this disclosure, will be aware of various additional or alternative feature learning approaches that may be used consistently with this disclosure. In other embodiments, outlier process machine learning model 156 may include a particle swarm clustering model, as described above. Identification of attribute clusters and/or outlier clusters may be performed, without limitation, as disclosed in U.S. Nonprovisional application Ser. No. 18/141,296, filed on Apr. 28, 2023 with "SYSTEMS AND METHODS FOR DATA STRUCTURE GENERATION," the entirety of which is incorporated herein by reference.

Still referring to FIG. 1, in some embodiments, processor 108 may determine outlier process without use of outlier process machine learning model. In some embodiments, processor 108 may determine outlier process as a function of predetermined associations between processes and attributes and/or attribute clusters. As a non-limiting example, processor 108 may look up one or more processes that are associated with outlier cluster from a list of associations between attribute clusters and processes, and processor 108 may determine these one or more associated processes to be outlier processes. As another non-limiting example, processor 108 may determine outlier process as a function of attributes in outlier cluster. As a non-limiting example, processor 108 may reference a list of associations between attributes and processes, and processor may add the association values for a process for each attribute within outlier cluster. In this example, processor 108 may determine outlier process to be the process with the highest association value sum. In some embodiments, such a calculation may use terms weighted by the degree of association between attribute and attribute cluster.

Still referring to FIG. 1, a datum may be represented as a data structure. In some embodiments, a data structure may include one or more functions and/or variables, as a class might in object-oriented programming. In some embodiments, a data structure may include data in the form of a Boolean, integer, float, string, date, and the like. In a non-limiting example, an attribute data structure may include a string representing the text of the attribute associated with the data structure. In some embodiments, data in a data structure may be organized in a linked list, tree, array, matrix, tenser, and the like. In a non-limiting example, an attribute cluster data structure may include a list of strings, each representing an attribute. In some embodiments, a data structure may include or be associated with one or more elements of metadata. A data structure may include one or more self-referencing data elements, which processor 108 may use in interpreting the data structure. In a non-limiting example, a data structure may include "<string>" and "</string>," tags, indicating that the content between the tags is a string.

Still referring to FIG. 1, a data structure may be stored in, for example, memory 104 or a database. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, in some embodiments, a data structure may be read and/or manipulated by processor 108. In a non-limiting example, processor 108 may read an attribute cluster and input data from attribute cluster into impact metric machine learning model. In another non-limiting example, processor 108 may create an attribute cluster data structure and add attribute to it or may add attribute to an existing attribute cluster data structure by modifying the attribute cluster data structure. In another non-limiting example, attribute cluster may include a Boolean indicating whether it is an outlier cluster, and processor 108 may modify this Boolean to indicate that attribute cluster is an outlier cluster based on impact metric.

Still referring to FIG. 1, in some embodiments, a data structure may be calibrated. In some embodiments, a data structure may be trained using a machine learning algorithm. In a non-limiting example, a data structure may include an array of data representing the biases of connections of a neural network. In this example, the neural network may be trained on a set of training data, and a back propagation algorithm may be used to modify the data in the array.

Still referring to FIG. 1, in some embodiments, apparatus 100 may determine a visual element data structure as a function of outlier process. In some embodiments, apparatus 100 may include at least a processor 108 and memory 104 communicatively connected to the at least processor 108, the memory 104 containing instructions configuring the at least processor 108 to determine a visual element data structure as a function of the outlier process.

Still referring to FIG. 1, in some embodiments, a visual element data structure may include a visual element. In some embodiments, a visual element data structure may include a rule for displaying visual element. In some embodiments, a visual element data structure may be determined as a function of an outlier process. In some embodiments, a visual element data structure may be determined as a function of an item from the list consisting of entity data, predetermined attribute list, attribute, attribute cluster, target process, impact metric, outlier cluster, and outlier process. In a non-limiting example, a visual element data structure may be generated such that visual element describing or highlighting outlier process is displayed to a user. In another non-limiting example, a visual element data structure may be generated such that attribute or attribute cluster is compared to an attribute or attribute cluster of another entity. In a non-limiting example, a visual element data structure may be generated such that target process is compared to outlier process. In a non-limiting example, a visual element data structure may be generated such that a plurality of attribute clusters and their associated impact metrics are displayed to a user. Visual element may include, for example, one or more elements of text, images, shapes, charts, particle effects, interactable features, and the like. In a non-limiting example, visual element may include the name of an entity in text, and outlier process, described in text. In a non-limiting example, visual element may include text describing a plurality of attribute clusters 116, text describing outlier cluster, and a particle effect around the text describing outlier cluster. In a non-limiting example, visual element may include images depicting a plurality of entities, and text describing attributes associated with those entities.

Still referring to FIG. 1, entity-specific recommendation 136 may be generated as function of attributes associated with an entity. Attributes may be compared to second datum 124 before being input into recommendation machine learning model 128. In some instances, predetermined recommendations may be compared to attributes to generate at least a modified set of predetermined recommendations. As a non-limiting example, predetermined recommendation may include changing a habit or eliminating a bad habit. Attribute may be that an entity enjoys exercise or being active. Predetermine recommendation may then be eliminating a bad habit associated with a non-active lifestyle. It should be noted that one of ordinary skill in the art, upon reading this disclosure, would know the various ways that predetermined recommendations may be determined.

Still referring to FIG. 1, recommendation machine learning model 128 may receive entity profile 112, first datum 120, second datum 124, and attributes as inputs to output at least an entity-specific recommendation 136. As a non-limiting example, first datum 120 may include entity capability metric, second datum may include predetermined recommendations, and entity profile 112 may include activities that an entity has completed in the past. Training data 132 used to train recommendation machine learning model 128 may include historical entity profiles 112, historical first datum 120, and historical second datum 124 correlated to historical entity-specific recommendations. It should be noted that inputs into recommendation machine learning model 128 may be pre-processed into a same data format before being input into recommendation machine learning model 128. As a non-limiting example, first datum 120 may be in a first format, and second datum 124 may be in a second format. Processor 108 may convert the first format to the second format or vice versa. As a non-limiting example, first datum 120 may be represented in vector space and second datum 124 may be represented in polynomial space. In that instance, first datum 120 May be linearly transformed to polynomial space. In some embodiments, the first and second formats may be converted into a third format.

Still referring to FIG. 1, recommendation module 116 may output at least an entity-specific recommendations 136. At least an entity-specific recommendation 136 may include activities, guides, meal plans, study plans, or things of the like based on entity profile 112, first datum 120, second datum 124, or any combination thereof. As a non-limiting example, entity profile 112 may include an entity's occupation and first datum 120 may indicate that the entity tends to procrastinate on tasks. The indication of procrastination may be done by determining a percentage of tasks completed within a certain threshold time period before a deadline (e.g., one day, one week, one month). Indication may also be made as a function of time of completion of a certain task prior to a due date. For example, if a task is assigned on the first of a month and due the first of the subsequent month, and the entity completes the task with less than 35% of time allotted remaining, it may indicate that the entity procrastinated. Recommendation module 116 may output at least a recommendation of a truncated time period to complete a task. For example, if an entity has one month to complete a task, second datum 124 may indicate that entity should complete the task before 35% of time is remaining on the task (i.e., in 4 weeks). However, at least an entity-specific recommendation 136 may indicate that entity should complete the task within one week. Entity-specific recommendation 136 may take into account entity's schedule and upcoming events. Additionally, entity-specific recommendation 136 may take into account prioritization of tasks. Prioritization of tasks may be performed as described in further detail below.

Still referring to FIG. 1, processor 108 may determine at least an interface element as a function of the at least an entity-specific recommendation. In some embodiments, recommendation module 116 may output one or more entity-specific recommendations. One or more entity-specific recommendations may be ranked as a function of importance to a particular entity. In some instances, a scoring function may be utilized to rank one or more entity specific recommendations. Scoring function may be any scoring function as described in further detail below. In some embodiments, processor may determine that more than one entity-specific recommendation is of a same priority. In some embodiments, more than one interface element may be selected as a function of priority.

Still referring to FIG. 1, processor 108 may utilize a scoring function may be expressed as a risk function representing an "expected loss" of an algorithm relating inputs to outputs, where loss is computed as an error function representing a degree to which a prediction generated by the relation is incorrect when compared to a given input-output pair provided in training data. In some instances, training data may include entity-specific recommendations correlated to at least an interface element. In some instances, training data may include entity-specific recommendations provided by a third-party source. In some instances, third-party source may be tangentially associated with entity. As a non-limiting example, third-party source may be a separate entity that shares a demographic classification with the entity.

In some embodiments, and without limitation, processor 108 may generate entity-specific recommendations by second datum as an expression, comparing second datum expression to a loss function, and minimizing the loss function as a function of first datum. In some embodiments, processor 108 may compute a score associated with each potential second datum, and may modify and/or select a potential second datum to minimize and/or maximize the score, depending on whether an optimal result is represented, respectively, by a minimal and/or maximal score; a mathematical function, described herein as an "objective function," may be used by processor 108 to score each possible pairing. Objective function may based on one or more objectives as described below. In various embodiments a score of a particular second datum may be based on a combination of one or more factors, including all factors, goals, or the like to be achieved as described in this disclosure. Each factor and/or second datum may be assigned a score based on predetermined variables. In some embodiments, the assigned scores may be weighted or unweighted.

Optimization of objective function may include performing a greedy algorithm process. A "greedy algorithm" is defined as an algorithm that selects locally optimal choices, which may or may not generate a globally optimal solution. For instance, processor 108 may select second datum so that scores associated therewith are the best score for each category and/or type of second datum.

Still referring to FIG. 1, objective function may be formulated as a linear objective function, which processor 108 may solve using a linear program such as without limitation a mixed-integer program. A "linear program," as used in this disclosure, is a program that optimizes a linear objective function, for instance using a linear optimization process, given at least a constraint. For instance, any first datum, including without limitation data describing capabilities and/or limits thereof, may be used as a constraint. In various embodiments, system 100 may determine a second datum that maximizes a total score subject to a constraint that second datum and/or parameters including second datum do not violate a constraint such as one or more constraints associated with first datum. A mathematical solver may be implemented to solve for the set of one or more elements of second data that maximizes scores; mathematical solver may implemented on processor 108 and/or another device in system 100, and/or may be implemented on third-party solver; score may include any score, metric, or the like to be With continued reference to FIG. 1, optimizing objective function may include minimizing a loss function, where a "loss function" is an expression an output of which an optimization algorithm minimizes to generate an optimal result. As a non-limiting example, processor 108 may assign variables relating to a set of parameters, which may correspond to score components as described above, calculate an output of mathematical expression using the variables, and select and/or generate a second datum that produces an output having the lowest size, according to a given definition of "size," of the set of outputs representing each of plurality of candidate ingredient combinations; size may, for instance, included absolute value, numerical size, or the like. Selection of different loss functions may result in identification of different potential pairings as generating minimal outputs.

Still referring to FIG. 1, processor 108 may generate at least an interface element. Processor 108 may transmit at least an interface element to display 140. In some instances, display may be a graphical user interface (GUI). In some embodiments, display 140 may include, but it is not limited to a liquid crystal display (LCD), a cathode ray tube (CRT), a plasma display, a light emitting diode (LED) display, and any combinations thereof. Display 140 may be utilized in combination with processor 108 to provide graphical representations of aspects of the present disclosure.

Still referring to FIG. 1, processor 108 may transmit at least an interface element to display 140 via a wired connection and/or a wireless connection. Wired connection transmission may include direct connection between processor and display. In some instances, wired connection may include intermediate relays disposed on a transmission pathway. In sone embodiments, data structure that includes at least an interface element to be displayed may need to be pre-processed prior to display. As a non-limiting example, at least an interface element data may have a dither applied. As used in this disclosure, "dither" is an applied form of noise used to randomize quantization error, preventing large-scale patterns such as color banding in images. In some instances, dithering may be performed at processor 108 prior to transmission. In another embodiment, dither may occur at another hardware portion of apparatus 100. Total transmission from processor 108 to display may take longer if at least an interface element data is transmitted from processor 108 to another hardware unit, then to display 140 than if it were direct.

Still referring to FIG. 1, processor 108 may transmit at least an interface element data to display 140 and receive a return signal. In some embodiments, return signal may contain a same number of packets as the initial transmission. In some embodiments, return signal may have a percent loss of data packets. Percent loss of data packets may be required to be below a threshold (e.g., 30%, 10%, 6%) to confirm transmission. In some instances, percent loss may be above a threshold percent loss. Processor 108 may resend at least an interface element data signal upon determining that percent loss is above a threshold percent loss. In some embodiments, processor 108 may transmit an error signal to display 140 in response to determining that percent loss is above a precent loss threshold. It should be noted that error signal may include a substantially smaller packet count than at least an interface element data signal. Advantageously, error signal may rarely experience transmission errors. In some embodiments, processor 108 may determine an additional error in transmitting error signal, using methods as described above.

Figure 2:
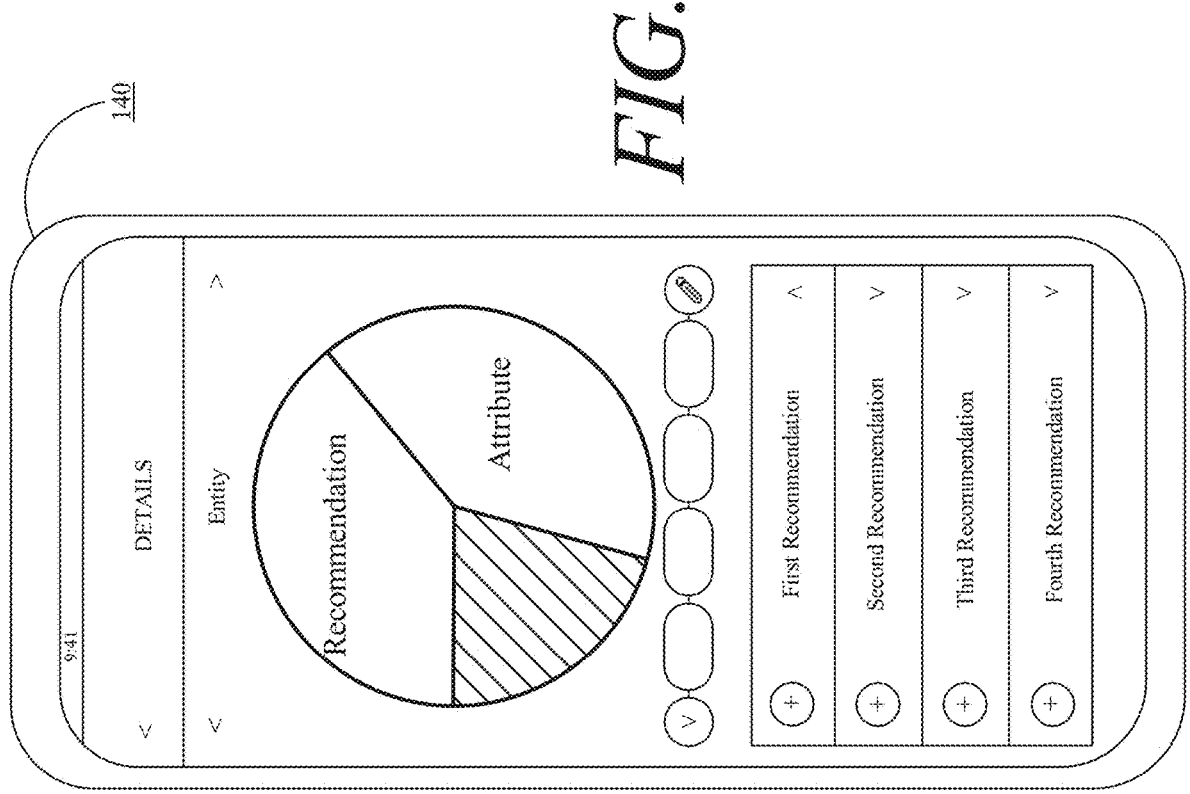
FIG. 2 is an illustrative embodiment of a user interface.

Now referring to FIG. 2, display 140 may display entity-specific recommendation 136 and at least an interface element as geometrical depiction. As used in this disclosure, a "geometrical depiction" is a graph, chart, or the like. As a non-limiting example, display 140 may display a pie chart depicting what contributed to entity specific recommendations. In some embodiments, pie chart may be color coordinated. Display 140 may include one or more toggle options. Toggle options may be disposed on any portion of display 140. In some embodiments, toggle options may be associated with one or more "what-if" scenarios. As used in this disclosure, "what-if scenarios" are predicted outcomes when at least a recommendation is performed by entity. For example, entity specific recommendation may include spending more time at the studio. Display 140 may illustrate an increase in time at the studio. As a non-limiting example, display 140 may include at least an interface element that depicts a graph showing entity's progression over time. In some instances, progression may be measured by time spent, it may be measured by number of times something is performed, or things of the like. It should be noted that, in some instances, processor 108 may generate multiple recommendations. Each recommendation may have a toggle option to show each predicted outcome of performing the associated recommendation.

Figure 3:
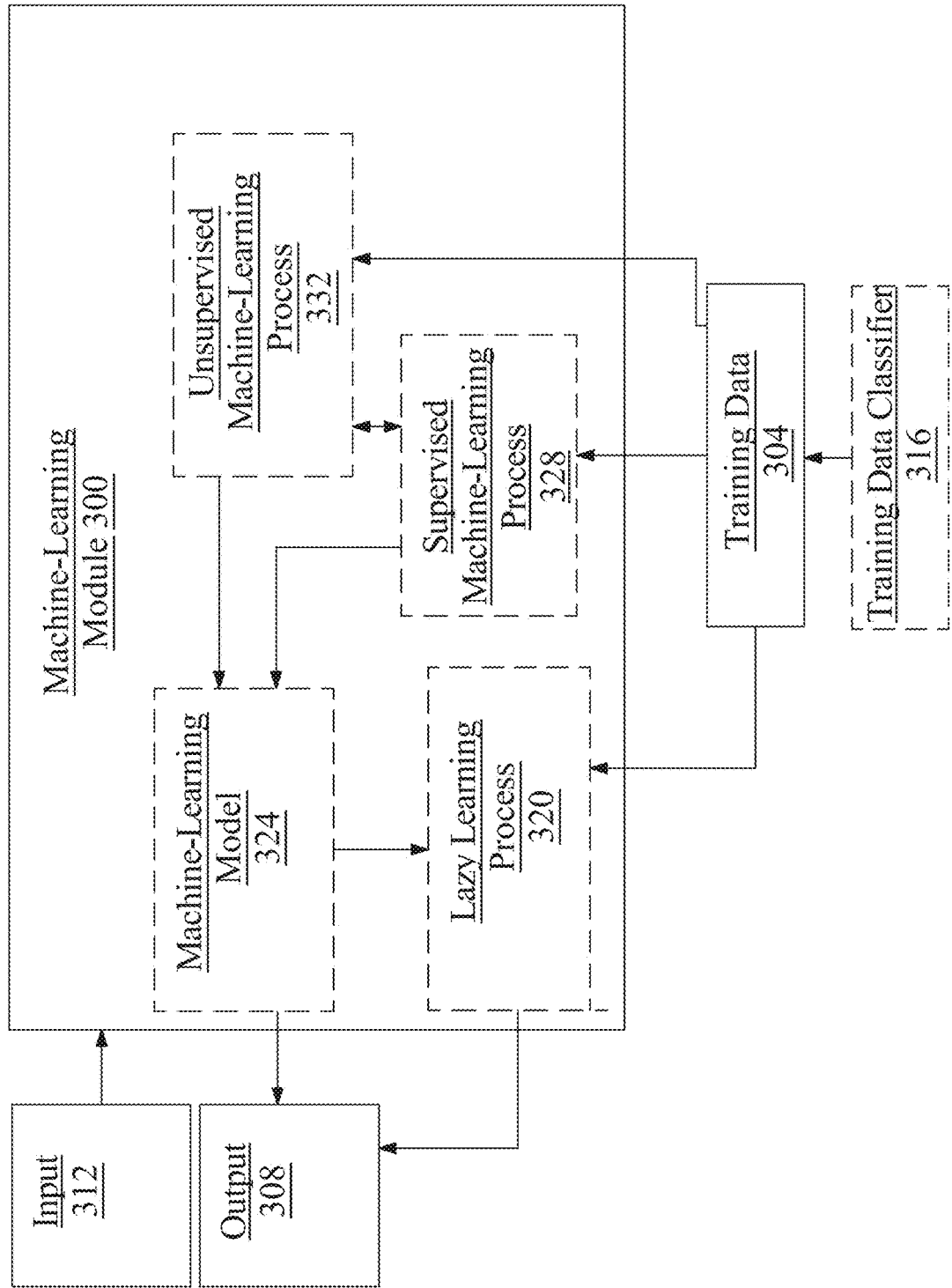
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example entity profile 112, first datum 120, second datum 124, or any combination thereof may be inputs to a recommendation machine learning model 128 to output payout entity-specific recommendations 136.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a process whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to types of payouts, delivery method of payouts, payout amounts, time elapsed from initial payout request, types of life event data (such as cause of death), number of beneficiaries, or things of the like.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include life event data 112, first entity 124, second entity 128, entity, or the like as described above as inputs, payout 144 as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 4:
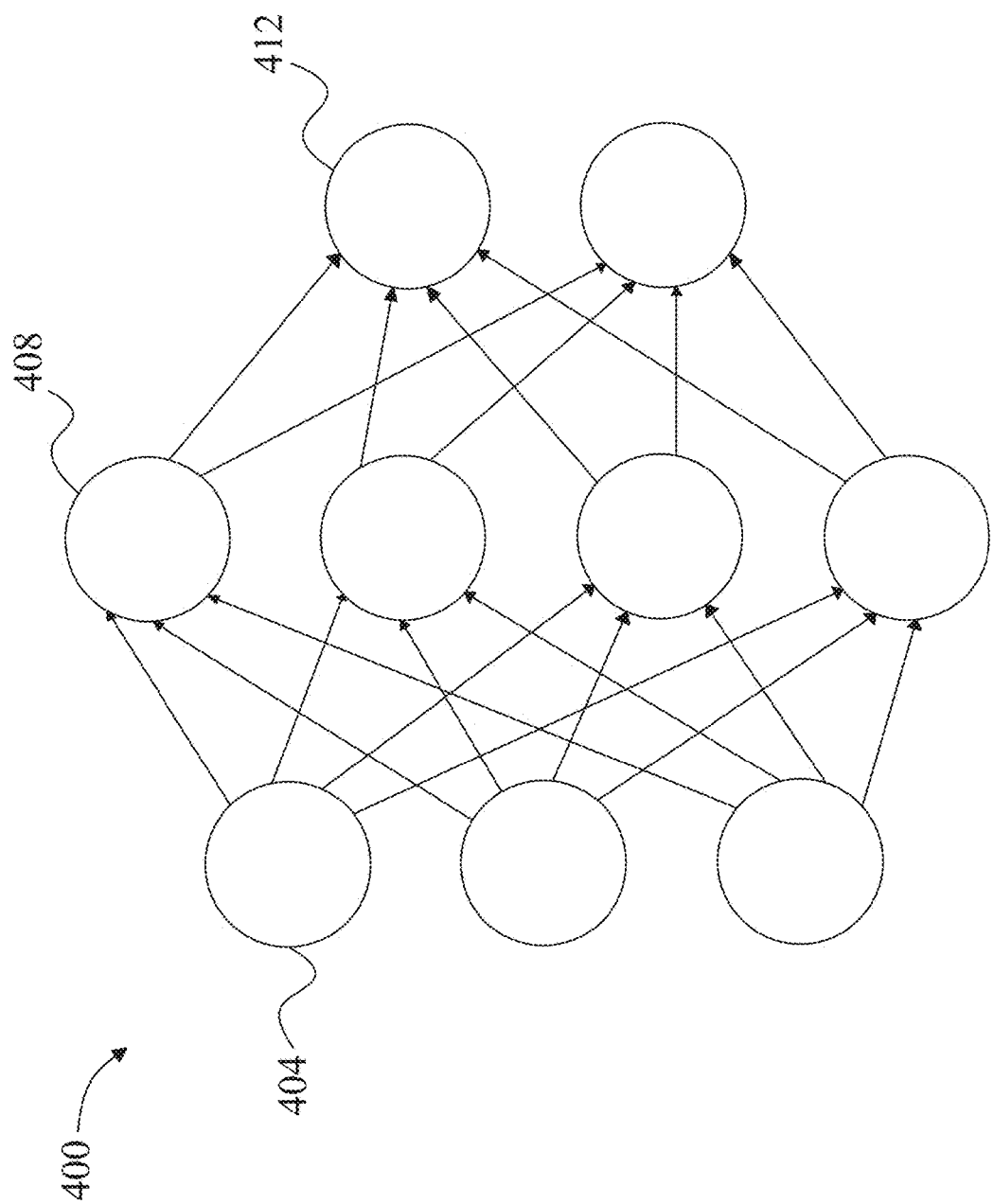
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
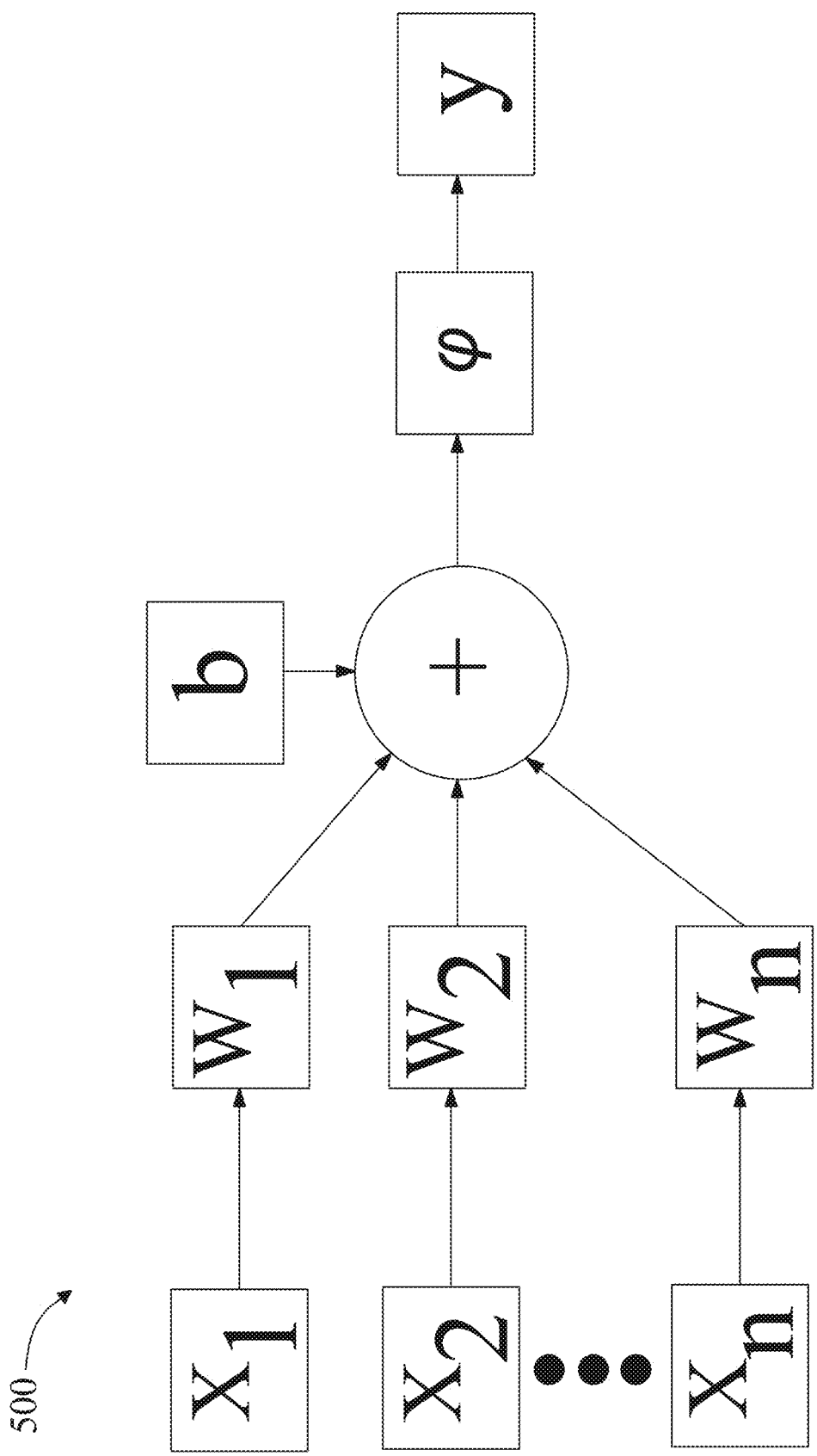
FIG. 5 is a diagram of an exemplary embodiment of a node of a neural network.

Referring now to FIG. 5, an exemplary embodiment of a node 500 of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function σ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
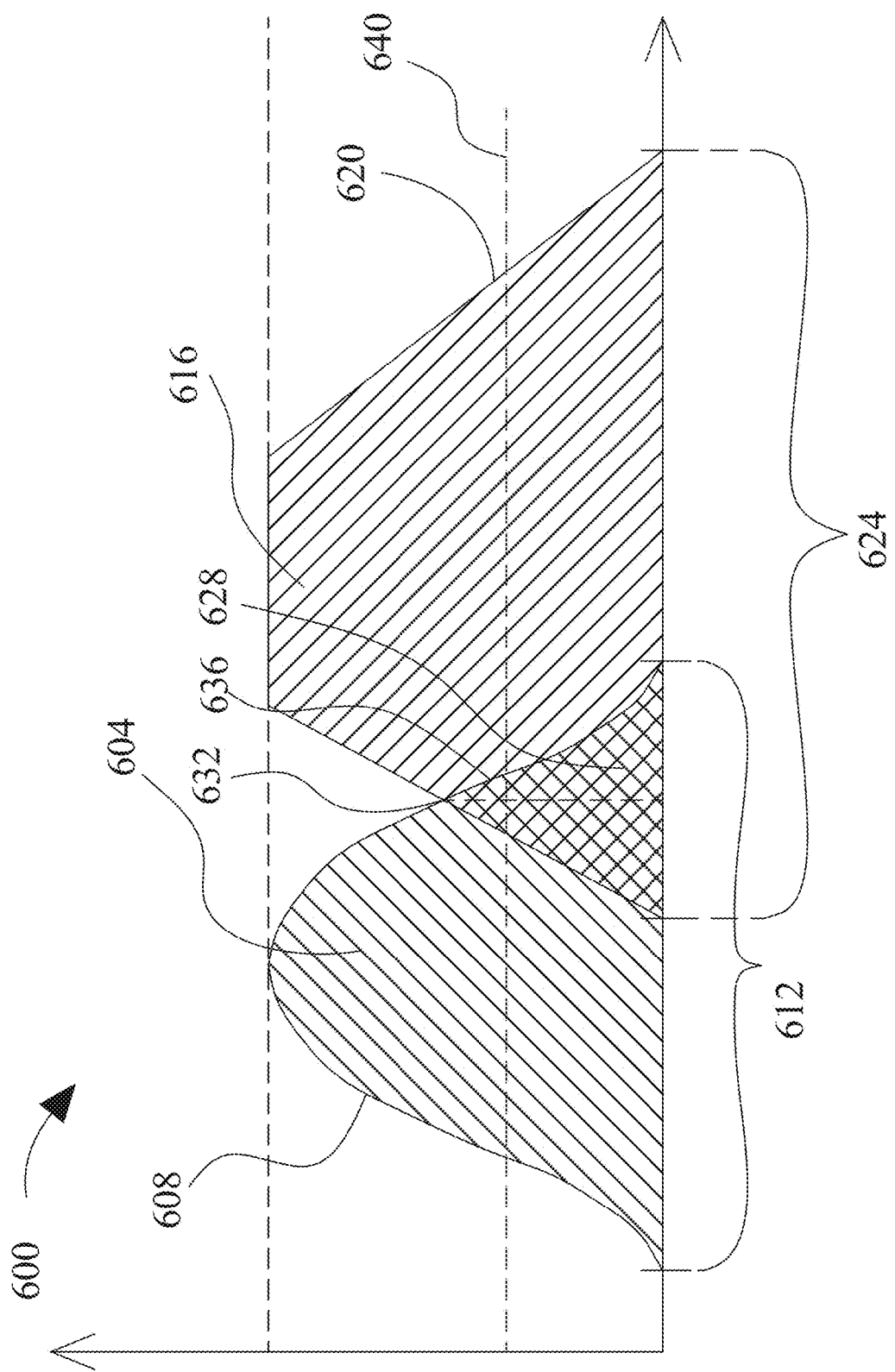
FIG. 6 is a graph illustrating an exemplary relationship between fuzzy sets.

Referring to FIG. 6, an exemplary embodiment of fuzzy set comparison 600 is illustrated. A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 6, first fuzzy set 604 may represent any value or combination of values as described above, including output from one or more machine-learning models, image data, device identification, verifier location, network latency, and a predetermined class, such as without limitation of recommendation. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 628 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, threshold may indicate a sufficient degree of overlap between an output from one or more machine-learning models and/or image data, device identification, verifier location, network latency, and a predetermined class, such as without limitation recommendation categorization, for combination to occur as described above. Alternatively or additionally, each threshold may be tuned by a machine-learning and/or statistical process, for instance and without limitation as described in further detail below.

Further referring to FIG. 6, in an embodiment, a degree of match between fuzzy sets may be used to classify image data, device identification, and/or at least an entity-specific recommendation. For instance, if an entity has a fuzzy set matching image data, device identification, at least an entity-specific recommendation fuzzy set by having a degree of overlap exceeding a threshold, processor 108 may classify, image data, device identification, at least an entity-specific recommendation as belonging to the achievable categorization. Where multiple fuzzy matches are performed, degrees of match for each respective fuzzy set may be computed and aggregated through, for instance, addition, averaging, or the like, to determine an overall degree of match.

Still referring to FIG. 6, in an embodiment, an image data, device identification, at least an entity-specific recommendation may be compared to multiple recommendation categorization fuzzy sets. For instance, image data, device identification, at least an entity-specific recommendation may be represented by a fuzzy set that is compared to each of the multiple recommendation categorization fuzzy sets; and a degree of overlap exceeding a threshold between the image data, device identification, at least an entity-specific recommendation fuzzy set and any of the multiple recommendation categorization fuzzy sets may cause processor 108 to classify the image data, device identification, at least an entity-specific recommendation as belonging to achievable categorization. For instance, in one embodiment there may be two recommendation categorization fuzzy sets, representing respectively entity-specific categorization and a non-entity specific categorization. First entity-specific recommendation categorization may have a first fuzzy set; Second entity-specific recommendation categorization may have a second fuzzy set; and image data, device identification, at least an entity-specific recommendation may have an image data, device identification, at least an entity-specific recommendation set. Processor 108, for example, may compare an image data, device identification, at least an entity-specific recommendation fuzzy set with each of recommendation categorization fuzzy set and in recommendation categorization fuzzy set, as described above, and classify image data, device identification, at least an entity-specific recommendation to either, both, or neither of recommendation categorization nor in recommendation categorization. Machine-learning methods as described throughout may, in a non-limiting example, generate coefficients used in fuzzy set equations as described above, such as without limitation x, c, and σ of a Gaussian set as described above, as outputs of machine-learning methods. Likewise, image data, device identification, at least an entity-specific recommendation may be used indirectly to determine a fuzzy set, as image data, device identification, at least an entity-specific recommendation fuzzy set may be derived from outputs of one or more machine-learning models that take the image data, device identification, at least an entity-specific recommendation directly or indirectly as inputs.

Still referring to FIG. 6, a computing device may use a logic comparison program, such as, but not limited to, a fuzzy logic model to determine a recommendation response. An recommendation response may include, but is not limited to, very unlikely, unlikely, likely, and very likely, and the like; each such recommendation response may be represented as a value for a linguistic variable representing recommendation response or in other words a fuzzy set as described above that corresponds to a degree of matching as calculated using any statistical, machine-learning, or other method that may occur to a person skilled in the art upon reviewing the entirety of this disclosure. In other words, a given element of image data, device identification, at least an entity-specific recommendation may have a first non-zero value for membership in a first linguistic variable value such as "very likely" and a second non-zero value for membership in a second linguistic variable value such as "very unlikely" In some embodiments, determining a recommendation categorization may include using a linear regression model. A linear regression model may include a machine learning model. A linear regression model may be configured to map data of image data, device identification, verifier location, network latency, such as degree of . . . to one or more recommendation parameters. A linear regression model may be trained using a machine learning process. A linear regression model may map statistics such as, but not limited to, quality of image data, device identification, or at least an entity-specific recommendation. In some embodiments, determining a recommendation of image data, device identification, or at least an entity-specific recommendation may include using a recommendation classification model. A recommendation classification model may be configured to input collected data and cluster data to a centroid based on, but not limited to, frequency of appearance, linguistic indicators of quality, and the like. Centroids may include scores assigned to them such that quality of . . . of image data, device identification, at least an entity-specific recommendation may each be assigned a score. In some embodiments recommendation classification model may include a K-means clustering model. In some embodiments, recommendation classification model may include a particle swarm optimization model. In some embodiments, determining the recommendation of an image data, device identification, or at least an entity-specific recommendation may include using a fuzzy inference engine. A fuzzy inference engine may be configured to map one or more image data, device identification, or at least an entity-specific recommendation data elements using fuzzy logic. In some embodiments, image data, device identification, at least an entity-specific recommendation may be arranged by a logic comparison program into recommendation arrangement. A "recommendation arrangement" as used in this disclosure is any grouping of objects and/or data based on skill level and/or output score. This step may be implemented as described above in FIGS. 1-4. Membership function coefficients and/or constants as described above may be tuned according to classification and/or clustering algorithms. For instance, and without limitation, a clustering algorithm may determine a Gaussian or other distribution of questions about a centroid corresponding to a given degree of matching level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 6, an inference engine may be implemented according to input and/or output membership functions and/or linguistic variables. For instance, a first linguistic variable may represent a first measurable value pertaining to image data, device identification, verifier location, network latency, such as a degree of matching of an element, while a second membership function may indicate a degree of in recommendation of a subject thereof, or another measurable value pertaining to image data, device identification, verifier location, network latency. Continuing the example, an output linguistic variable may represent, without limitation, a score value. An inference engine may combine rules, such as: "if image is likely this verifier, device is highly likely the verifier's device, location is likely correct, and network latency is likely correct, then verifier is highly likely to be identified"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max (a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

Further referring to FIG. 6, image data, device identification, at least an entity-specific recommendation to be used may be selected by user selection, and/or by selection of a distribution of output scores, such as 100% very likely, 100% very unlikely, or the like. Each recommendation categorization may be selected using an additional function such as in recommendation as described above.

Figure 7:
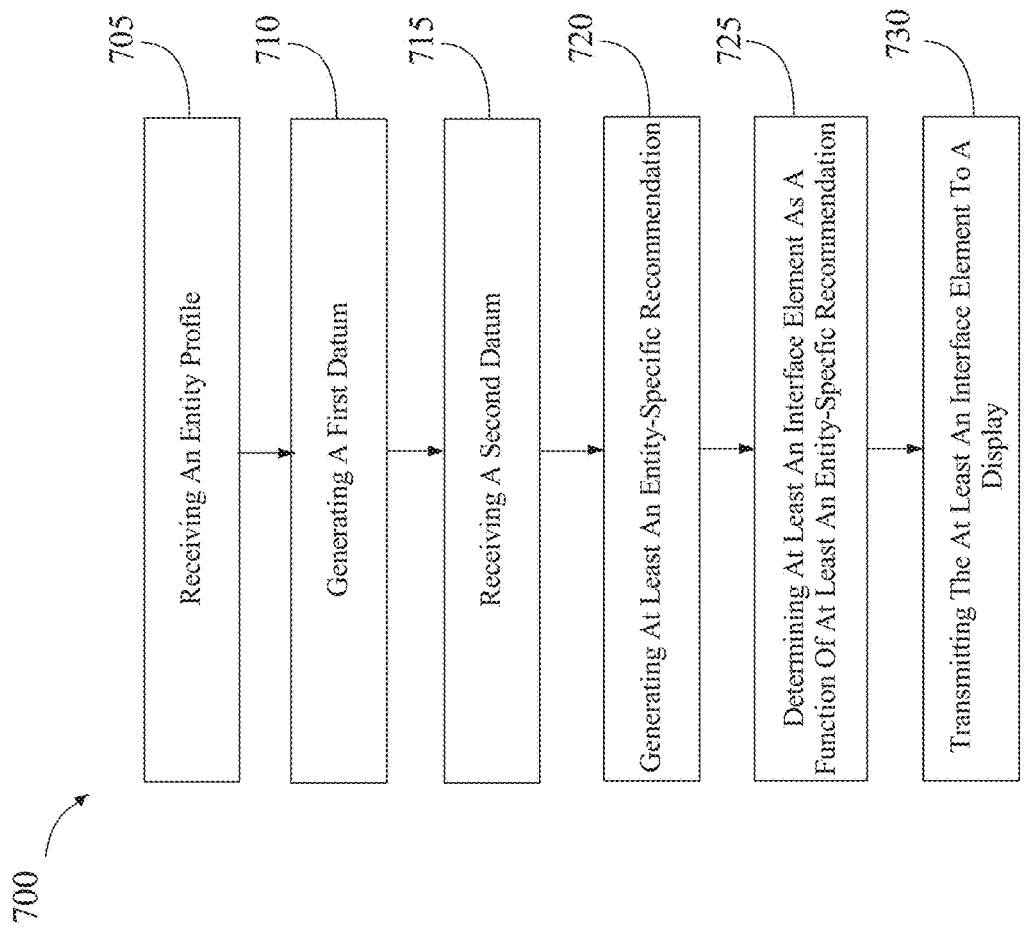
FIG. 7 is a flow diagram of an exemplary method for routine improvement for an entity.

Referring to FIG. 7, an exemplary method 700 for routine improvement for an entity. Method 700 includes a step 705, receiving, by at least a processor, an entity profile. In some embodiments, receiving the entity profile comprises receiving image data. This may occur as described above in reference to FIGS. 1-5.

With continued reference to FIG. 7, method 700 includes a step 710 of generating, by the at least a processor, a first datum. In some embodiments, generating the first datum further comprises processing the image data. In some embodiments, processing at least an image file comprises down-sampling the image data to a desired pixel count. In some embodiments, processing the image data comprises utilizing chroma averaging to fill in pixels in a pixel array. This may occur as described above in reference to FIGS. 1-5.

With continued reference to FIG. 7, method 700 includes a step 715 of receiving, by the at least a processor, a second datum. This may occur as described above in reference to FIGS. 1-5.

With continued reference to FIG. 7, method 700 includes a step 720 of generating, by the at least a processor, at least an entity-specific recommendation. In some embodiments, generating the entity-specific recommendations further comprises converting the first datum and the second datum to a same data format. In some embodiments, converting the first datum and the second datum to the same data format further comprises adding dummy values to the first datum. In some embodiments, generating the entity-specific recommendations further comprises representing the second datum as an expression. This may occur as described above in reference to FIGS. 1-5.

With continued reference to FIG. 7, method 700 includes at step 725 of determining, by the at least a processor, at least an interface element as a function of the at least an entity-specific recommendation. This may occur as described above in reference to FIGS. 1-5.

With continued reference to FIG. 7, method 700 includes a step 730 of transmitting, by the at least a processor, the at least an interface element to a display. This may occur as described above in reference to FIGS. 1-5.

It is to be noted that any one or more of the aspects and embodiments described herein may be conveniently implemented using one or more machines (e.g., one or more apparatus s that are utilized as a user apparatus for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
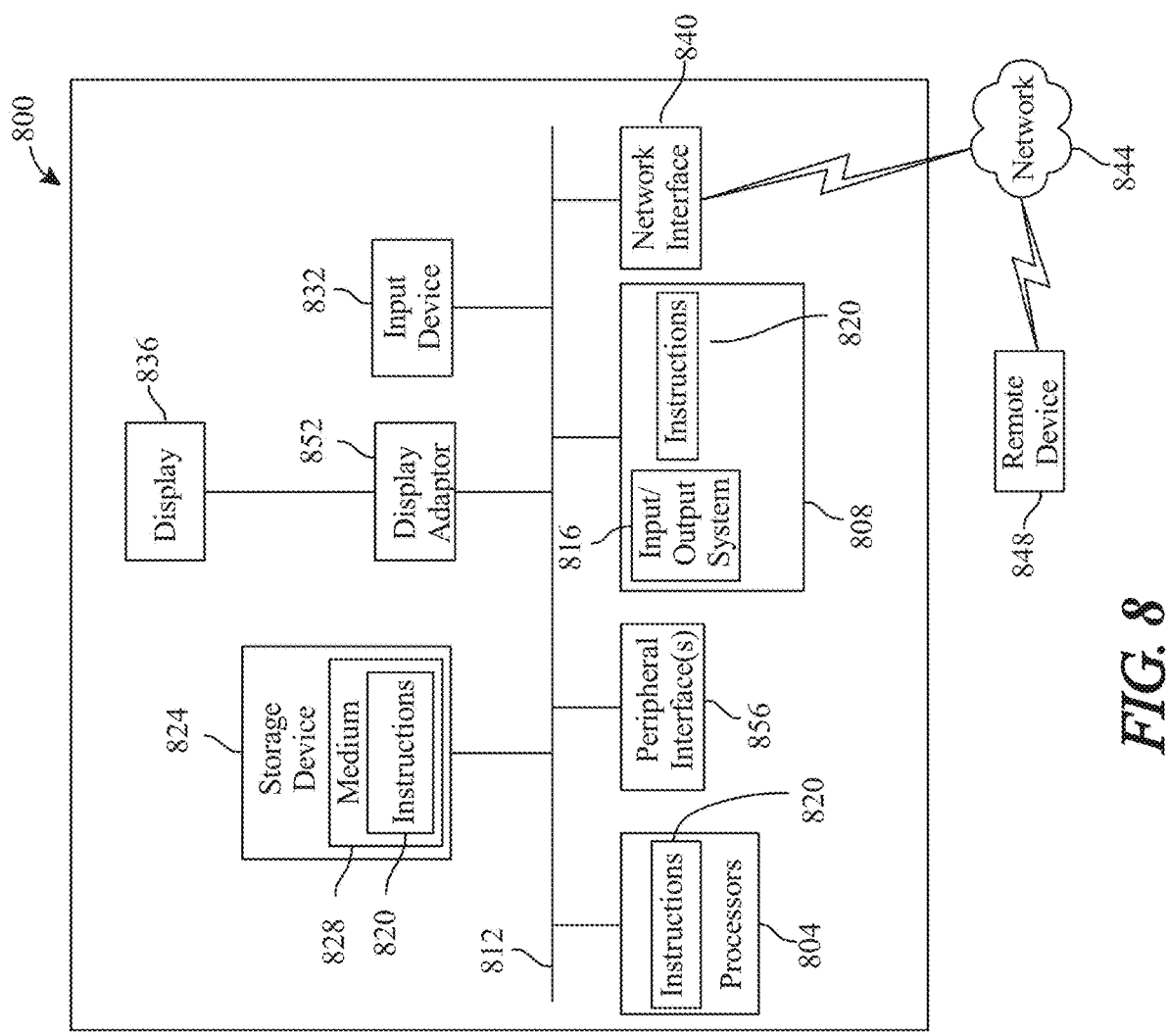
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatuses, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A method for routine improvement for an entity, the method comprising:
    receiving, by at least a processor, an entity profile, wherein receiving the entity profile comprises:
        receiving an IP address associated with a known location of an entity and appended to a data packet containing entity profile data;
        authenticating the entity by:
            determining an actual time lapse between a computing device associated with the entity and the at least a processor;
            comparing the actual time lapse to an expected time lapse, wherein the expected time lapse is determined based on entity location and data packet size; and
            comparing the IP address to a plurality of stored flagged IP addresses previously identified by the at least a processor;
    generating, by the at least a processor, a first datum;
    receiving, by the at least a processor, a second datum;
    generating, by the at least a processor, at least an entity-specific improvement recommendation as a function of the second datum and first datum utilizing a recommendation machine learning model which further comprises:
        receiving a first training data, wherein the first training data correlates a plurality of first datums and a plurality of second datums to a plurality of entity-specific improvement recommendations;
        training, iteratively, the recommendation machine learning model using the first training data, wherein training the recommendation machine learning model includes retraining the recommendation machine learning model with feedback from previous iterations of the recommendation machine learning model; and generating the at least an entity-specific improvement recommendation as a function of the first datum and the second datum using the trained recommendation machine learning model, wherein generating the at least an entity-specific improvement recommendation comprises identifying a plurality of attribute clusters;

calculating, by the at least a processor, an impact metric as a function of the plurality of attribute clusters, wherein calculating the impact metric comprises:

training an impact metric machine learning model using a second training data, wherein the second training data comprises a plurality of attribute cluster inputs correlated to a plurality of impact metric outputs, wherein training the impact metric machine learning model comprises:

iteratively updating the second training data as a function of adjusted inputs and desired outputs of the impact metric machine learning model;

retraining the impact metric machine learning model using the updated second training data; and calculating the impact metric using the trained impact metric machine learning model;

determining, by the at least a processor, at least an interface element as a function of the at least an entity-specific improvement recommendation and the impact metric; and transmitting, by the at least a processor, the at least a user interface element to a display.

2. The method of claim 1, wherein identifying the plurality of attribute clusters further comprises locating, in the plurality of attribute clusters, an outlier cluster.

3. The method of claim 2, further comprising determining an outlier process as a function of the outlier cluster.

4. The method of claim 1, wherein generating the at least an entity-specific improvement recommendation comprises generating a modified predetermined recommendation as a function of an attribute and the second datum.

5. The method of claim 1, wherein generating the at least an entity-specific recommendation further comprises converting the first datum and the second datum to a third data format.

6. The method of claim 5, wherein converting the first datum and the second datum to the third data format further comprises adding dummy values to the first datum.

7. The method of claim 1, wherein generating the at least an entity-specific recommendation further comprises:

representing the second datum as an expression;

comparing the second datum expression to a loss function; and minimizing the loss function as a function of the first datum.

8. The method of claim 7, wherein minimizing the loss function further comprises performing a linear optimization process on the loss function.

9. The method of claim 1, wherein determining the at least an interface element comprises utilizing a risk function representing an expected loss of an algorithm relating the at least an entity-specific recommendation to the at least an interface element.

10. The method of claim 1, wherein transmitting the at least an interface element comprises applying a dither to the at least an interface element.

11. An apparatus for routine improvement for an entity, comprising:

at least a processor; and a memory communicatively connected to the processor, the memory containing instructions configuring the at least a processor to:

receive an entity profile, wherein receiving the entity profile comprises:

receiving an IP address associated with a known location of an entity and appended to a data packet containing entity profile data;

authenticating the entity by:

determining an actual time lapse between a computing device associated with the entity and the at least a processor;

comparing the actual time lapse to an expected time lapse, wherein the expected time lapse is determined based on entity location and data packet size; and comparing the IP address to a plurality of stored flagged IP addresses previously identified by the at least a processor;

generate a first datum;

receive a second datum;

generate at least an entity-specific improvement recommendation as a function of the second datum and first datum utilizing a recommendation machine learning model which further comprises:

receiving a first training data, wherein the first training data correlates the first datum and second datum to an entity-specific improvement recommendation;

training, iteratively, the recommendation machine learning model using the first training data, wherein training the recommendation machine learning model includes retraining the recommendation machine learning model with feedback from previous iterations of the recommendation machine learning model; and generating the at least an entity-specific improvement recommendation as a function of the first datum and the second datum using the trained recommendation machine learning model;

calculate an impact metric as a function of a plurality of attribute clusters, wherein calculating the impact metric comprises:

training an impact metric machine learning model using a second training data, wherein the second training data comprises the plurality of attribute clusters as inputs correlated to the impact metric as outputs, wherein training the impact metric machine learning model comprises:

iteratively updating the second training data as a function of adjusted inputs and desired outputs of the impact metric machine learning model;

retraining the impact metric machine learning model using the updated second training data; and calculating the impact metric using the trained impact metric machine learning model; and determine at least a user interface element as a function of the at least an entity-specific improvement recommendation;

transmit the at least an interface element to a display.

12. The apparatus of claim 11, wherein generating the at least an entity-specific improvement recommendation comprises identifying the plurality of attribute clusters.

13. The apparatus of claim 12, wherein identifying the plurality of attribute clusters further comprises locating, in the plurality of attribute clusters, an outlier cluster.

14. The apparatus of claim 13, further comprising determining an outlier process as a function of an outlier cluster.

15. The apparatus of claim 13, wherein generating the at least an entity-specific improvement recommendation comprises generating a modified predetermined recommendation as a function of an attribute and the second datum.

16. The apparatus of claim 11, wherein generating the at least an entity-specific recommendation further comprises converting the first datum and the second datum to a third data format.

17. The apparatus of claim 16, wherein converting the first datum and the second datum to the third data format further comprises adding dummy values to the first datum.

18. The apparatus of claim 11, wherein generating the at least an entity-specific recommendation further comprises:

representing the second datum as an expression;

comparing the second datum expression to a loss function; and minimizing the loss function as a function of the first datum.

19. The apparatus of claim 11, wherein determining the at least an interface element comprises utilizing a risk function representing an expected loss of an algorithm relating the at least an entity-specific recommendation to the at least an interface element.

20. The apparatus of claim 11, wherein transmitting the at least an interface element comprises applying a dither to the at least an interface element.

* * * * *